June 17, 1941.  F. B. LLEWELLYN  2,245,598
WAVE TRANSLATION SYSTEM
Filed Oct. 7, 1938

Oscillation Avoided When Polar Plot Of $\upsilon_a + 1/\beta$ Versus Frequency Avoids Inclosing Point 1,0

When $Z_a = 0$, Distortion $D' = 0$ When $\gamma_a$ Is Negative And Equal To $-Z_a$ INVENTOR
F. B. LLEWELLYN
BY
B. C. Eager
ATTORNEY Patented June 17, 1941

2,245,598

UNITED STATES PATENT OFFICE 2,245,598

WAVE TRANSLATION SYSTEM

Frederick B. Llewellyn, Verona, N. J., assignor to Bell Telephone Laboratories, Incorporated, New York, N. Y., a corporation of New York Application October 7, 1938, Serial No. 233,760

13 Claims. (Cl. 179—171)

This invention relates to wave translating systems, as for example electric wave amplifying systems or systems employing vacuum tube or other electric wave amplifying devices.

Objects of the invention are to control transmission properties of such systems, as for example modulation or distortion they produce, and their stability with respect to generation of self-sustained oscillations.

In one specific aspect the invention is a multi-stage amplifier for amplifying waves of a band of frequencies, having a feedback path producing over-all negative feedback with the feedback ratio of greater order of magnitude than unity in the transmission band, and having a feedback path for producing positive feedback in the transmission band around certain of the stages excluding the last with the complex feedback ratio for the positive feedback unity.

As pointed out hereinafter, the critically valued positive feedback causes distortion produced by the last stages to vanish and at the same time the negative feedback prevents the circuit from singing, notwithstanding the positive feedback with feedback ratio $$1 \angle 0$$

Moreover, the critically valued positive feedback causes the complex amplification ratio to be the negative reciprocal of the propagation through the feedback path for the negative feedback, which facilitates equalizing or controlling transmission by control of the transmission properties of the feedback path for the negative feedback. The positive feedback does not harm the gain stability of the amplifier, provided the inherent stability of the portion of the amplifier around which the positive feedback path is connected is not less than that of the remaining portion; nor does the positive feedback increase the distortion originating in the portion of the amplifier around which the positive feedback path is connected. Moreover, the positive feedback does not seriously affect the margins of the amplifier against singing or self-sustained oscillation when the feedback ratio for the negative feedback is large compared to unity.

The invention is by no means limited to the specific aspect referred to above. For example, the feedback ratio for the positive feedback need not be exactly the optimum value unity at which the distortion disappears or is entirely eliminated. With the ratio near unity, the distortion becomes less and less as the complex feedback ratio for the positive feedback is made to approach nearer and nearer to the value unity. Again, in accordance with the invention the stability against undesired self-oscillation can be obtained as pointed out hereinafter without having the over-all feedback negative; and the circuit configuration may vary widely from the specific aspect referred to above by way of example, without departure from the invention. Moreover, in accordance with a feature of the invention a negative impedance may be employed either in conjunction with or instead of the positive feedback, for eliminating or reducing distortion. Ways in which this can be done are indicated by way of example hereinafter.

In accordance with another feature of the invention, instead of employing a single positive feedback circuit, with complex feedback ratio equal to or approximately unity, a plurality of such circuits may be employed in cascade. As explained hereinafter, this can facilitate distortion reduction over a wide frequency band where in practice it might be difficult to maintain unity feedback ratio over the band. Moreover, if desired, the plurality of positive feedbacks can be adjusted so that each has its feedback ratio unity or approximately unity at a different frequency. As explained hereinafter, this can still further facilitate distortion reduction over a wide frequency band, or can be made to suppress particular discrete distortion frequencies, for example harmonics of the carrier frequency in a radio transmitter when these harmonics give rise to undesirable interference with other transmitters.

It is an object of the invention to eliminate or reduce distortion in systems such as those referred to above.

It is also an object of the invention to eliminate or reduce distortion over wide frequency bands in such systems.

It is also an object of the invention to effect such distortion control and at the same time maintain satisfactory gain stability and margins against singing.

A further object of the invention is to facilitate equalizing or controlling transmission in feedback amplifiers by control of the transmission properties of a feedback path.

Other objects and aspects of the invention will be apparent from the following description and claims.

Figure 1:
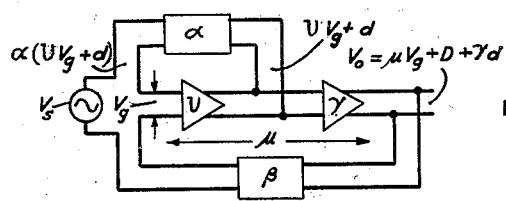
Fig. 1 shows schematically an amplifier embodying one form of the invention.

The amplifier of Fig. 1 is divided into two portions in cascade, having respectively the amplifications $\nu$ and $\gamma$, the amplification of the two portions together being $\nu\gamma$ or $\mu$. Between the $\nu$ and $\gamma$ portions a feedback circuit whose propagation is $\alpha$ is attached. At the end of the amplifier is connected the usual feedback circuit whose propagation is $\beta$. The input signal which it is desired to amplify is denoted by $V_s$ and the distortion produced by a given signal level at the output of the amplifier is denoted by $D$. For the sake of generality a distortion component $d$ is included in the analysis. This distortion is that produced at the output of the $\nu$ portion of the amplifier. It is much smaller than $D$, even when amplified by $\gamma$. In following the analysis for the first time, it is suggested that the reader will make better progress by imagining $d$ to be zero. Its inclusion, while complicating the analysis, shows that the $\alpha$-circuit does nothing to make the distortion produced by the intermediate stages of the system either markedly worse or better than it would be in the absence of the $\alpha$-feedback.

The voltages appearing across the various terminals of the system are given in Fig. 1. $V_s$ is the signal voltage to be amplified as indicated above. $V_g$ is the voltage on the grid of the first amplifier tube (or the input voltage of the $\nu$ portion of the amplifier). $V_o$ is the output voltage of the amplifier. The voltage fed back by the $\alpha$-circuit is equal to $\alpha$ times the output voltage of the $\nu$ portion of the amplifier, that is, to $\alpha(\nu V_g + d)$.

The output voltage is $$V_o = \mu V_g + \gamma d + D \qquad (1)$$

Then the relation between the input signal $V_s$ and the voltage $V_g$ is given by $$V_g = V_s + \beta(\mu V_g + \gamma d + D) + \alpha(\nu V_g + d) \qquad (2)$$

Solving (2) for $V_g$ we obtain $$V_g = \frac{V_s + \beta D + (\beta\gamma + \alpha)d}{1 - \alpha\nu - \beta\mu} \qquad (3)$$

By substitution of the value of $V_g$ from (3) in (1) and after algebraic simplification, we arrive at the following general expression for the output resulting from the signal input $V_s$ and distortion components $D$ and $d$:

$$V_o = \left(\frac{\mu}{1-\nu\alpha-\mu\beta}\right)V_s + \left(\frac{\gamma}{1-\nu\alpha-\mu\beta}\right)d + \left(\frac{1-\nu\alpha}{1-\nu\alpha-\mu\beta}\right)D \qquad (4)$$

or, dividing the numerator and denominator of (4) by $(1-\nu\alpha)$, $$V_o = \left(\frac{\frac{\mu}{1-\nu\alpha}}{1-\frac{\mu\beta}{1-\nu\alpha}}\right)V_s + \left(\frac{\frac{\gamma}{1-\nu\alpha}}{1-\frac{\mu\beta}{1-\nu\alpha}}\right)d + \left(\frac{1}{1-\frac{\mu\beta}{1-\nu\alpha}}\right)D \qquad (5)$$

Equation 5 is a slightly different form of Equation 4, showing that, in so far as external performance of the amplifier is concerned, positive feedback around the $\nu\alpha$ loop has the apparent effect of increasing the $\mu$ gain. Thus, writing $$\mu' = \frac{\mu}{1-\nu\alpha}$$

we have (5) in the form $$V_o = \frac{\mu'}{1-\mu'\beta}V_s + \frac{\mu'}{1-\mu'\beta}\frac{d}{\nu} + \frac{1}{1-\mu'\beta}D \qquad (5a)$$

which is the equation of the normal feedback amplifier with $\mu$ replaced by the modified value $\mu'$.

When $\nu\alpha = 1$, substitution in (4) or (5) gives:

$$V_o = \left(-\frac{1}{\beta}\right)V_s - \left(\frac{1}{\nu\beta}\right)d \qquad (6)$$

which shows that the distortion from $D$ has been entirely suppressed.

In regard to the distortion $d$ produced in the first, or $\nu$-portion of the amplifier, it is easy to show that the $\alpha$-feedback has no effect on the final $d$-distortion, so that it is ultimately neither materially better nor worse than in the ordinary feedback circuit. Thus, in the absence of $\alpha$ and with an input signal $$V_s'$$

such that the output is the same as that of a double feedback amplifier we have $$V_o = \frac{\mu V_s'}{1-\mu\beta} + \frac{\gamma d}{1-\mu\beta} + \frac{D}{1-\mu\beta} \qquad (7)$$

This must be compared with (6) which may be written $$V_o = -\frac{1}{\beta}V_s - \frac{\gamma d}{\mu\beta} \qquad (8)$$

When $|\mu\beta|$ is large compared with unity, then both the signal and $d$-term in (7) and (8) are identical. Thus, the effect of the $\alpha$-feedback has been to suppress the $D$-distortion without producing harmful effects.

In regard to gain stability or stability with respect to changes of tubes, operating voltages, etc., the $\alpha$-feedback ratio, $\nu\alpha$, being of magnitude unity compared with $\mu\beta$ which may have a much greater magnitude, has not reduced the stability. This may be seen directly from the first term on the right of (4) for the condition that $|\mu\beta|$ is much greater than unity.

In case $\nu\alpha$ is not equal to unity, the improvement in the distortion from $D$ instead of being infinite as indicated by the complete absence of this distortion from Equation 6, is an improvement which may be expressed as follows:

Let $1 - \nu\alpha = K$, and let $|K|$ lie between zero and unity. Then the distortion is reduced by the factor, $$\text{reduction factor} = \frac{K}{K-\mu\beta} \qquad (9)$$

and then, when $|\mu\beta| >> |K|$, the reduction factor approaches the value given by the relation:

$$\text{reduction factor} \longrightarrow \frac{-|K|}{|\mu\beta|} \qquad (10)$$

As indicated by the last term of Equation 5a involving $D$, in this amplifier the distortion originating in the $\gamma$-system is reduced to the same extent that the apparent $\mu$-gain is augmented by positive feedback. In the limit when $\nu\alpha$ is unity, the apparent $\mu$, namely $\mu'$, is infinite, so that the amplifier behaves as though there were an infinite negative feedback operating on the output distortion $D$.

When oscillation is to be avoided, the stability criterion is that when the graph of $(\nu\alpha+\mu\beta)$ is plotted on the complex plane this graph of $(\nu\alpha+\mu\beta)$ shall not encircle nor pass through the point (1, 0)    (11)

As pointed out above, $d$ is small. Therefore, in the Equations 4 and 5 the term involving D is the bothersome one; and it is pointed out that the vector feedback ratio $\nu\alpha$ now appears in the bothersome term in such a way that the distortion D becomes less and less as $\nu\alpha$ is made to approach nearer and nearer to the value unity. Moreover, the distortion D is completely eliminated or disappears as shown by Equation 6 when $\nu\alpha$ is made equal to unity. Thus, when distortion D is to be eliminated in this manner, $\nu\alpha$ over the operating frequency range or passband of the amplifier should be made a vector feedback ratio whose value is unity or as nearly unity as practicable, i. e., its modulus should be made unity or as nearly unity as practicable and its argument or phase angle should be made zero or as nearly zero as practicable. However, even with $|1-\nu\alpha|$ as large as 0.1, or even with as much as six degrees phase in $\nu\alpha$, the distortion can be reduced some 20 decibels over and above the reduction obtained normally by the $\beta$-feedback path. Fortunately, as emphasized hereinafter, the stability criterion for the feedback system given by expression 11 above, does not require that the plot of $\nu\alpha$ on the complex plane avoid encircling or passing through the point (1, 0), and thus the condition $\nu\alpha=1$ does not conflict with the stability condition.

A significant feature of the system is that when $\nu\alpha=1$, while virtually infinite negative feedback appears to be acting upon distortion appearing in the $\gamma$-system, neither distortion originating in the $\nu$-system, nor the signal itself, is greatly affected by the positive feedback. Apparent anomalies are explained when it is remembered that the stability rule generally known as "Nyquist's rule," (i. e., the rule brought out for example in Nyquist Patent 1,915,440, June 27, 1933, H. S. Black Patent 2,102,671, December 21, 1937, or H. Nyquist's article on "Regeneration theory," published in the Bell System Technical Journal, July 1932, that to avoid oscillation around a feedback loop the graph of the propagation around the loop when plotted in the complex plane, must avoid enclosing the point 1, 0, or in other words must neither encircle nor touch or pass through the point 1, 0), does not apply to functions with positive poles such as the numerator of the first term in Equation 5. The rule can be safely applied to Equation 4, however, which is sufficient to determine stability. The net effect of the positive feedback upon the signal is to make the output wholly a function of $\beta$; thus eliminating an ordinarily undesirable effect which may be called $\mu\beta$ finitude effect, i. e., the departure of the amplification of the amplifier from the value $$-\frac{1}{\beta}$$

due to the finitude of $\mu\beta$.

The presence of positive feedback of magnitude unity (and phase angle zero) does not seriously affect the stability margins of the amplifier against oscillation when $\mu\beta$ is so large that $\nu\alpha$ is negligibly small in comparison to $\mu\beta$. Relation 11, which is obtained from consideration of the denominator of Equation 4, shows that only a relatively small numerical modification in the negative feedback occurs in the design of a stable double feedback amplifier. It would be natural (but erroneous) to expect there would be an additional requirement for stability, namely, that $\nu\alpha$ could neither encircle nor pass through 1, 0. This would require that $\nu\alpha$, when given zero phase, be somewhat smaller than unity in the useful frequency range, thus permitting some of the distortion originating in the $\gamma$-portion of the amplifier to remain in the output. A more serious drawback, under this stability requirement, would be the oscillations resulting in the $\nu\alpha$ loop from a slight increase in $\nu$. It is emphasized, however, that it has been found unnecessary to limit $\nu\alpha$ to values less than unity, provided that the negative feedback ratio, $\mu\beta$, is always greater in magnitude than the positive feedback ratio, $\nu\alpha$, or, more generally, provided that the graph of $\nu\alpha+\mu\beta$ does not encircle nor touch (1, 0). Physically, this may be taken to mean that under this condition any voltage appearing at the input of the amplifier because of a tendency toward oscillation in the $\nu\alpha$ loop, would be opposed by a voltage produced by the $\mu\beta$-feedback. Thus, a critically valued positive feedback around the input tubes of the amplifier eliminates the distortion from D at the same time that a negative feedback around the whole amplifier prevents it from singing.

It is emphasized that the provision that, when oscillation is to be avoided, the graph of $\nu\alpha+\mu\beta$ shall not encircle nor pass through 1, 0, does not prevent $\nu\alpha+\mu\beta$ from having a value that, for some frequencies, is greater than unity with zero phase shift. As long as the value of $\mu\beta$ is not zero, the value of $\mu\beta$ is immaterial as regards the attainment of the elimination of the distortion by the positive feedback or $\alpha$-feedback; and by circuit design the value of $\mu\beta$ can be made such that the graph of $\nu\alpha+\mu\beta$ does not enclose nor pass through the point 1, 0 and therefore oscillation is avoided. However, by making $\mu\beta$ (in the transmission band) negative and of absolute magnitude greater than unity, (with $\nu\alpha$ equal to unity), $\nu\alpha+\mu\beta$ can be made negative and then the distortion reducing and gain stabilizing effect usual in reversed-phase feedback amplifiers is obtained, as well as the distortion reducing effect of the positive feedback or $\alpha$-feedback. Thus it is often desirable to have $\mu\beta$ (in the transmission band) large compared to unity or much greater than unity, as for example, several times ten decibels.

As indicated above in connection with the first term of the general Equation 4 which represents the undistorted output of the amplifier, changes in $\mu$ produce no greater changes in amplifier gain than do changes in amplification of the amplifying element or path of the ordinary negative feedback amplifier; or, in other words, the gain stability of the amplifier has not been harmed by the introduction of the positive feedback.

Further, as noted above, the $\mu\beta$-finitude effect is reduced. For instance, it is eliminated when $\nu\alpha$ is unity, or it is reduced to .1 of its value without the positive feedback when $\nu\alpha$ is equal to .9.

Figure 2:
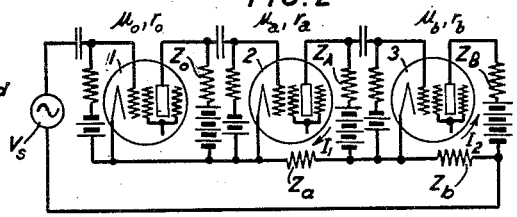
Fig. 2 is a more detailed diagram of a very simple amplifier circuit of the type indicated in Fig. 1.

The amplifier of Fig. 2 is a three-stage amplifier comprising $\mu$, $\beta$, $\nu$ and $\alpha$ portions such as are shown in Fig. 1, the $\mu$-portion comprising cascaded amplifying devices 1, 2 and 3 shown by way of example as vacuum tubes or electric space discharge devices. The $\mu$-portion of the system of Fig. 2 comprises the $\nu$-portion and a $\gamma$-portion in cascade, as shown in Fig. 1, the $\nu$-portion comprising tubes 1 and 2, and the $\gamma$-portion comprising tube 3. The positive feedback or $\alpha$-feedback is provided by an $\alpha$-feedback impedance $Z_a$ connected from the cathodes of the first two tubes to the cathode of the third tube. The negative feedback or $\beta$-feedback is provided by a $\beta$-feedback impedance $Z_b$ connected in series with the load impedance $Z_B$ of the last tube. In other words, each feedback is a series-series feedback, instead of a series-shunt feedback as indicated in Fig. 1.

Plate circuit coupling impedances $Z_0$ and $Z_A$ are shown for tubes 1 and 2, respectively. The batteries shown represent usual plate and grid voltage supply sources or means; and usual stopping condensers and grid leak impedances are shown in the interstage networks. The tube cathodes, and their heating means (not shown), may be of any usual or suitable type, and the screen grids may be biased positively in the usual manner, as by batteries (not shown) connected between screen and cathode in the individual tubes.

Let $D'$ designate distortion voltage produced within the last tube;

Let $I_1$ and $I_2$ designate mesh currents whose paths and directions are indicated by the arrows in Fig. 2;

Let amplification factors and internal plate impedances of the tubes be designated by $\mu_o$ and $r_o$ for tube 1, and by $\mu_a$ and $r_a$ for tube 2 and by $\mu_b$ and $r_b$ for tube 3, as indicated in Fig. 2; and Let $\mu_a'$ designate $$\frac{\mu_o Z_o}{r_o + Z_o} \mu_a$$

Then with the simplifying condition that the grid-leak resistance across the input of tube 1 is so high that input current may be disregarded, the network equations governing the system are:

$$\begin{vmatrix} \dfrac{I_1}{r_a + Z_A + Z_a(1-\mu_a')} & \dfrac{I_2}{Z_b\mu_a'} \\ -\mu_b' Z_A & Z_B + r_b + Z_b \end{vmatrix} \begin{vmatrix} \mu_a' V_s \\ D' \end{vmatrix} \quad (12)$$

so that:

$$I_2 = \frac{\mu_a'\mu_b Z_A V_s + [r_a + Z_A + Z_a(1-\mu_a')]D'}{\mu_a'\mu_b Z_A Z_b + [r_a + Z_A + Z_a(1-\mu_a')](Z_B + r_b + Z_b)} \quad (13)$$

If now we write $$\frac{\mu_a' Z_A}{r_a + Z_A + Z_a} = \nu \quad (14)$$

$$\frac{\mu_b Z_B}{r_b + Z_B + Z_b} = \gamma \quad (15)$$

then, calling the product $\gamma\nu$ by the symbol $\mu$, we can express the output voltage, $I_2 Z_B$, in the form $$V_o = \frac{\mu V_s + \left(1 - \nu\dfrac{Z_a}{Z_A}\right)\left[D'\dfrac{Z_B}{r_b + Z_B + Z_b}\right]}{1 - \nu\dfrac{Z_a}{Z_A} + \mu\dfrac{Z_b}{Z_B}} \quad (16)$$

Comparing this with Equation 4, and disregarding the distortion $d$, we see that $\nu$ and $\gamma$ as defined by Equations 14 and 15 correspond with the symbols of Equation 4 and further that $$\alpha = \frac{Z_a}{Z_A} \quad (17)$$

$$\beta = -\frac{Z_b}{Z_B} \quad (18)$$

When these substitutions are made in Equation 16, it becomes identical with Equation 4 when account is taken of the fact that the distortion $D$ in Equation 4 is that appearing across the output, whereas $D'$ in Equation 16 is the distorting electromotive force within the tube. The relation between them is evidently, $$D = D' \frac{Z_B}{r_b + Z_B + Z_b} \quad (19)$$

When $\nu\alpha = 1$, that is, when $$\frac{\mu_a' Z_a}{r_a + Z_A + Z_a} \cdot \frac{Z_a}{Z_A} = 1 \quad (20)$$

then, from Equation 16

$$V_o = \frac{Z_B}{Z_b} V_s$$

which, in view of Equation 18, agrees with Equation 6 with $d$ disregarded.

Thus, the circuit of Fig. 2 carries out the principles of the schematic Fig. 1 and adjustment in accord with Equation 20 reduces the distortion to zero. The stability requirements are that the graph of $\nu\alpha + \mu\beta$, that is, of $$\left(\frac{\mu_a' Z_a}{r_a + Z_A + Z_a}\right)\frac{Z_a}{Z_A} - \left(\frac{\mu_a' Z_A}{r_a + Z_A + Z_a}\right)\left(\frac{\mu_b Z_B}{r_b + Z_B + Z_b}\right)\frac{Z_b}{Z_B} \quad (21)$$

shall not encircle nor pass through the point (1, 0) when plotted on the complex plane.

Figure 3:
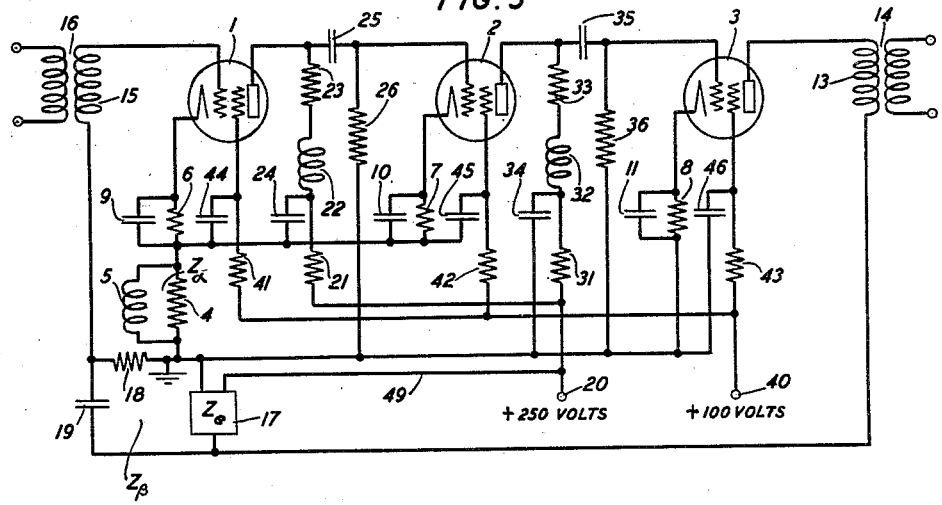
Fig. 3 is a circuit diagram of another amplifier of the type indicated in Fig. 1.

The amplifier of Fig. 3 is a further example of a three-stage amplifier comprising $\mu$, $\beta$, $\nu$ and $\alpha$-portions such as are shown in Fig. 1, the $\mu$-portion comprising cascaded amplifying devices 1, 2 and 3 shown by way of example as vacuum tubes or electric space discharge devices. The $\mu$-portion of the system of Fig. 3 comprises the $\nu$-portion and a $\gamma$-portion in cascade, as shown in Fig. 1, the $\nu$-portion comprising tubes 1 and 2, and the $\gamma$-portion comprising tube 3. The positive feedback or $\alpha$-feedback is provided by an $\alpha$-feedback impedance $Z_a$, comprising a resistance 4 connected between the cathodes of the first two tubes and ground. If desired, $Z_a$ may include also an inductance, as shown at 5, for by-passing direct current around the resistance 4, grid biasing voltages for the tubes 1, 2, and 3 being furnished by grid-biasing resistors 6, 7 and 8, respectively, with their respective by-pass condensers 9, 10 and 11. The negative feedback or $\beta$-feedback is provided by a $\beta$-feedback impedance $Z_\beta$, shown as comprising impedance 17 shunted by resistance 18 and stopping condenser 19 in series. The impedance $Z_\beta$ is connected in series relation with the primary winding 13 of output transformer 14 and the resistance 18 is connected in series relation with the secondary winding 15 of input transformer 16. The impedance 17 may be a transmission control network, as for example, a $\beta$-circuit equalizing network or impedance $Z_e$ for equalizing transmission in the circuit in which the amplifier is connected, in the general manner explained for example, in H. S. Black Patent 2,102,671, December 21, 1937. It is seen that the $\alpha$ and $\beta$-feedback connections are series connections at the input sides of the $\nu$ and $\mu$-portions, respectively of the amplifier, and are also series connections at the output sides of these portions. In other words, each feedback is a series-series feedback, instead of a series-shunt feedback as indicated in Fig. 1.

Plate voltage for tube 1 is supplied from the 250 volt terminal 20 of the power supply source through resistor 21 and an interstage coupling impedance comprising inductance 22 and resistor 23. By-pass condenser 24 forms with resistor 21 a filter for the plate voltage. The first interstage coupling circuit comprises stopping condenser 25 and grid leak resistor 26.

In connection with tubes 2 and 3, elements 31, 32, 33, 34, 35 and 36 function as do elements 21, 22, 23, 24, 25 and 26, respectively, in connection with tubes 1 and 2.

Screen voltages are supplied from terminal 40 through resistances 41, 42 and 43 to the screen grids of tubes 1, 2 and 3, respectively, by-pass condensers 44, 45, and 46 cooperating with resistors 41, 42 and 43 respectively to filter the screen voltages.

Plate voltage for tube 3 is supplied from terminal 20 through conductor 49 a portion of network 17 and winding 13.

Figure 4:
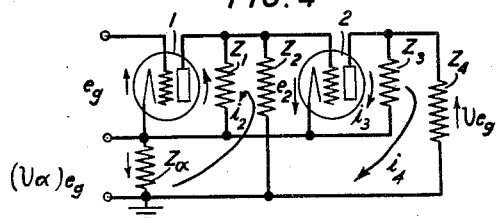
Fig. 4 is an equivalent circuit of a portion of the amplifier of Fig. 3, for facilitating explanation of the design of the amplifier.

Fig. 4 shows a circuit equivalent to the positive feedback system or $\nu\alpha$ portion of the amplifier of Fig. 3. Mesh currents $i_1, i_2, i_3$ and $i_4$, network impedances $Z_a, Z_1, Z_2, Z_3$ and $Z_4$, and voltages $e_g$, $e_2$, $\nu e_g$ and $(\nu\alpha)e_g$ are indicated in Fig. 4, and the design equations for the positive feedback system are given below, where $Z_1$ and $Z_2$ include the plate resistance as well as the plate-cathode capacitance of the tubes, shunting any external impedance. The design equations for the positive feedback may be derived as about to be indicated, it being noted that, in Equations I and II below, $Z_a$ has been neglected in quantities such as $(Z_a+Z_1+Z_2)$ and $(Z_a+Z_3+Z_4)$, in view of its relative smallness. Let the mutual conductances of tubes 1 and 2 be $s_m$ and $s'_m$, respectively. Then $$i_1 = s_m e_0; \quad i_3 = s_m e_2; \quad e_2 = (i_1-i_2)Z_1$$

$$\begin{bmatrix}(i_4-i_2)Z\alpha - i_2 Z_2 + (i_1-i_2)Z_1 = 0 \\ (i_4-i_2)Z\alpha + i_4 Z_4 - (i_3-i_4)Z_3 = 0\end{bmatrix}$$

Solving:

$$\nu = \frac{i_4 Z_4}{e_0}$$

$$= \frac{s_m\left(\frac{Z_1 Z_2}{Z_1+Z_2}\right)s'_m\left(\frac{Z_3 Z_4}{Z_3+Z_4}\right)+s_m Z\alpha\left(\frac{Z_1}{Z_1+Z_2}\right)\left(\frac{Z_4}{Z_3+Z_4}\right)}{1+s'_m Z\alpha\left(\frac{Z_1}{Z_1+Z_2}\right)\left(\frac{Z_3}{Z_3+Z_4}\right)}$$

(I)

$$\nu\alpha = \frac{(i_4-i_2)Z\alpha}{e_0}$$

$$= \frac{s_m\left(\frac{Z_1 Z_2}{Z_1+Z_2}\right)s'_m Z\alpha\left(\frac{Z_3}{Z_3+Z_4}\right)-s_m Z\alpha\left(\frac{Z_1}{Z_1+Z_2}\right)}{1+s'_m Z\alpha\left(\frac{Z_1}{Z_1+Z_2}\right)\left(\frac{Z_3}{Z_3+Z_4}\right)}$$

(II)

As indicated by the expression II for the vector feedback ratio $\nu\alpha$, with the method shown for obtaining positive feedback by inclusion of the feedback impedance $Z_a$ between the cathodes of the first two tubes and ground, $\nu\alpha$ is not a simple function of interstage impedance and tube transconductance, but (because of interstage impedances, primarily capacitive, to cathode as well as to ground) includes addition factors which introduce phase shifts, particularly at high frequencies. Ordinarily such phase shifts should be made as small as practicable, since, as indicated above, maximum distortion reduction is obtained when $\nu\alpha$ has a magnitude of unity and has zero phase shift. To aid in maintaining the magnitude unity, the voltages supplied to the tubes may be closely regulated.

Although in the circuits of Figs. 2 and 3 the positive negative feedbacks are each taken off from the amplifier in series fashion and applied in series fashion, various methods of taking off and applying the feedbacks are available. For example, the positive feedback may be of the series-series type, the shunt-shunt type, the series-shunt type or the shunt-series type with the negative feedback of any of these types. Two instances of such types of feedbacks are indicated in Figs. 5 and 6 now to be described.

Figure 5:
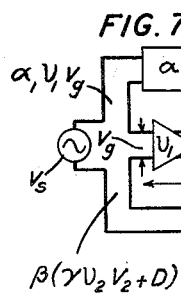

Fig. 5 is a generalized showing of the alternating current circuits of a three-stage amplifier with positive and negative feedbacks that is generally similar to the amplifier of Fig. 2, but with the $\alpha$-feedback taken off between the second and third tubes in shunt fashion and applied through impedance 50 to the input of the amplifier in shunt fashion. The interstage coupling circuits are shown in generalized form as impedances 51 and 52. The incoming circuit for the amplifier is shown as a source of voltage 53 and impedance 54. The load circuit is shown as an impedance 55. The negative feedback or $\beta$-feedback is taken off from an impedance 56 which is in series with the load impedance 55 and also in series with the incoming circuit. It is seen that in this amplifier, the $\alpha$-feedback is shunt-shunt feedback and the $\beta$-feedback is series-series feedback.

Figure 6:
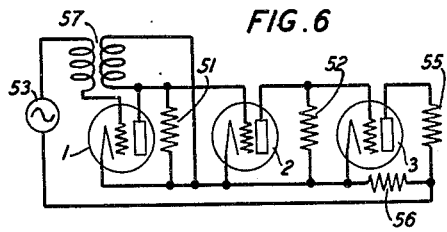
Figs. 5, 6 and 7 are circuit diagrams of three other forms of amplifier circuits embodying aspects of the invention.

Fig. 6 shows an amplifier circuit similar to that of Fig. 5 but with the $\alpha$-feedback taken off between the first and second tubes in shunt fashion and applied through a phase reversing transformer 57 to the input of the amplifier in series fashion. Thus, the positive feedback is series-shunt feedback and the negative feedback is series-series feedback.

Figure 7:
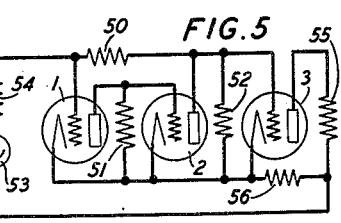

The preceding examples show advantages which may be obtained from a single positive feedback or $\alpha$-feedback circuit. Several such circuits can be employed in cascade, and thereby a multiplication of their advantages can be obtained. The circuit schematic of Fig. 7 illustrates the application of two such $\alpha$-circuits, denoted respectively by $\alpha_1$ and $\alpha_2$. The $\nu$-portion of the amplifier is subdivided into sub-portions $\nu_1$ and $\nu_2$ such that the feedback ratio around $\nu_1$ is $\alpha_1$ and that around $\nu_2$ is $\alpha_2$. The circuit analysis follows the lines described in connection with Fig. 1 and the output $V_0$ resulting from an input signal $V_s$ and a distortion D originating at the end of the $\gamma$-portion may be written $$V_o = \frac{\mu V_s}{(1-\nu_1\alpha_1)(1-\nu_2\alpha_2)-\mu\beta} + \frac{(1-\nu_1\alpha_1)(1-\nu_2\alpha_2)}{(1-\nu_1\alpha_1)(1-\nu_2\alpha_2)-\mu\beta}D \quad (22)$$

where $$\mu = \nu_1\nu_2\gamma$$

The oscillation stability criterion is that the denominator on the right of Equation 22 shall neither encircle nor pass through the origin when plotted on the complex plane. This is evidently the same thing as that $$(\nu_1\alpha_1+\nu_2\alpha_2-\nu_1\nu_2\alpha_1\alpha_2+\mu\beta) \quad (23)$$

shall not encircle nor pass through $(1, 0)$, which rule is an analogous form to Equation 11 for the single $\alpha$-circuit.

Two important advantages obtainable by the use of two or more $\alpha$-circuits will be indicated with reference to Equation 22. As was pointed out above, it may not be possible to make $\nu\alpha$ exactly equal to unity over a wide frequency band. However, it may be made near enough unity so that $|K|=|1-\nu\alpha|$ is a number much smaller than unity. It follows with two α-circuits in which respectively $$|K_1| = |1 - \nu_1\alpha_1|$$

and $$|K_2| = |1 - \nu_2\alpha_2|$$

that the product $|K_1K_2|$ is much smaller than either $|K_1|$ or $|K_2|$ alone when each is individually much smaller than unity. Thus Equation 22 shows that the distortion reduction is increased by a plurality of α-circuits. Again, in order to cover a wide frequency band, the magnitude $|K_1K_2|$ may be made less than either alone over the band by adjustment so that their individual zero values do not coincide at the same frequency.

The second of the above-mentioned two advantages of the multiple α-circuit arrangement is obtained in those cases where there exist certain discrete distortion frequencies which it is particularly desirable to suppress. Such a case occurs in a radio transmitter where the second and third harmonics of the carrier frequency give rise to undesirable interference with other transmitters. In such a case, the application of one α-circuit adjusted so that $\alpha_1\nu_1 = 1$ at the second harmonic, and a second α-circuit adjusted so that $\alpha_2\nu_2 = 1$ at the third harmonic, will remove both interfering effects at the same time that the β-circuit restrains the system so that undesirable self-oscillations do not occur. In the case of radio transmitters or other amplifying systems including frequency changing circuits, the β-circuit may be applied, for example, in the manner indicated in E. B. Ferrell Patent 2,159,020, May 23, 1939, C. F. P. Rose Patent 2,172,453, September 12, 1939, H. W. Bode Patent 2,123,178, July 12, 1938, my Patent 2,070,666, February 16, 1937, or J. W. Smith-G. N. Thayer Patent 2,114,036, April 12, 1938.

For instance, in accordance with the present invention, in a radio transmitter such as that of Fig. 16 of the Bode patent just mentioned the amplifier 19 may be of the type shown in Fig. 7 herein, except with the over-all feedback or β-feedback of this Fig. 7 omitted and its functions performed by the feedback through the paths 24, 25, 27 in the radio transmitter. In other words, the amplifier 19 of the radio transmitter may be provided with positive feedbacks such as the α1-feedback and the α2-feedback of Fig. 7 herein. The complex feedback ratios for these positive feedbacks so provided may be made unity or as nearly unity as practicable for the frequencies at which distortion is to be suppressed. If desired, the ratios for these positive feedbacks may be made unity at the second and third harmonics, respectively, of the carrier frequency.

By way of further example, in accordance with the present invention, in a system such as that of the Smith-Thayer patent just mentioned, one positive feedback path may be connected around the first stage of the five-stage amplifier 25 or around the first two or the first three of the stages (for instance as the α1-path is connected around the ν1-portion of Fig. 7 herein), and a second positive feedback path may be connected around one or more of the remaining stages of the first four stages (for instance as the α2-path is connected around the ν2-portion of Fig. 7). The complex feedback ratios for the positive feedbacks so provided may be made unity or as nearly unity as practicable for the frequencies at which distortion is to be suppressed. If desired, the ratios for these positive feedbacks may be made unity at the second and third harmonics, respectively, of the carrier frequency.

The extension from 2 to the general case of n α-circuits is obvious. The equation analogous to Equation 22 is $$V_o = \frac{\mu V_s}{(1-\nu_1\alpha_1)(1-\nu_2\alpha_2)(1-\nu_3\alpha_3)\ldots(1-\nu_n\alpha_n)-\mu\beta} + \frac{(1-\nu_1\alpha_1)(1-\nu_2\alpha_2)(1-\nu_3\alpha_3)\ldots(1-\nu_n\alpha_n)}{(1-\nu_1\alpha_1)(1-\nu_2\alpha_2)(1-\nu_3\alpha_3)\ldots(1-\nu_n\alpha_n)-\mu\beta}D \quad (24)$$

where $$\mu = \nu_1\nu_2\nu_3 \ldots \nu_n\gamma$$

The oscillation stability criterion is that, when the graph of $$[(1-\nu_1\alpha_1)(1-\nu_2\alpha_2)\ldots(1-\nu_n\alpha_n)-\mu\beta]$$

is plotted on the complex plane, this graph of $$[1-\nu_1\alpha_1)(1-\nu_2\alpha_2)\ldots(1-\nu_n\alpha_n)-\mu\beta] \quad (25)$$

shall not encircle nor pass through the origin.

The basic theory underlying all of the illustrations given above may be outlined as follows: It is well known that electrical networks, whether containing vacuum tubes or not, may be represented by a system of simultaneous linear equations, in so far as the first order response is concerned. Moreover, second order effects which includes certain kinds of distortion may be included in these same equations by the simple expedient of regarding non-linear impedances as being the equivalent of linear impedances containing distorting electromotive forces. On this basis, there will be one equation for each mesh of the system, and in conventional notation they may all be represented by the diagram $$\begin{array}{cccc|c}
I_1 & I_2 & \ldots & I_n & \\
\hline
Z_{11} & Z_{12} & \ldots & Z_{1n} & V_1 \\
Z_{21} & Z_{22} & \ldots & Z_{2n} & V_2 \\
Z_{31} & Z_{32} & \ldots & Z_{3n} & V_3 \\
& & \ldots & & \\
Z_{n1} & Z_{n2} & \ldots & Z_{nn} & V_n
\end{array} \quad (26)$$

Suppose now that $V_1$ is the signal which it is desired to transmit and that $V_2$ is the only distorting electromotive force. Since all of the other V's may then be expressed in terms of these two, Equation 26 may be rewritten in such a way that only these two V's appear, and we have:

$$\begin{array}{cccc|c}
I_1 & I_2 & \ldots & I_n & \\
\hline
Z_{11} & Z_{12} & \ldots & Z_{1n} & V_1 \\
Z_{21} & Z_{22} & \ldots & Z_{2n} & V_2 \\
Z_{31} & Z_{32} & \ldots & Z_{3n} & 0 \\
& & \ldots & & \\
Z_{n1} & Z_{n2} & \ldots & Z_{nn} & 0
\end{array} \quad (27)$$

If the output mesh be taken as the third, for example, then the output current may be written $$I_3 = \frac{V_1 A_{13}}{\Delta} + \frac{V_2 A_{23}}{\Delta} \quad (28)$$

where $\Delta$ is the determinant of the Z's and $A_{jk}$ is the cofactor of the $j^{th}$ column and $k^{th}$ row. This last equation shows clearly that the output current will contain no distortion provided that $A_{23}$ is zero. Moreover, in the general case where there is more than one distortion source, Equation 26 shows that the output current may be written $$I_3 = \frac{V_1 A_{13}}{\Delta} + \sum_{K=2}^{n} \frac{V_k A_{k3}}{\Delta} \quad (29)$$

In this case the output current is undistorted provided that all of the A's in the last term of Equation 29 are zero. Oscillations are avoided when the solution of the equation $$\Delta = 0 \quad (30)$$

contains no roots with positive real parts, which means physically that the complete solution of the network equations contains no terms increasing indefinitely with time. When, as in all passive networks and some active ones, $\Delta$ contains no poles with positive real parts, this oscillation stability condition is the same as the criterion that the graph of $\Delta$ plotted on the complex plane neither encircles no passes through the origin.

All of the circuits discussed above may be analyzed by this general method, and in fact it has been followed closely in the description of Fig. 2. In the circuits of Figs. 1 to 7, inclusive, the vanishing of the desired cofactor in Equation 29 has been brought about by the positive feedback or $\alpha$-feedback. In the more general case, a specific feedback is not necessary, but may be replaced by a negative impedance element.

By way of example, the circuit of Fig. 2 may be referred to in connection with Equations 12 and 13. Here the coefficient of $D'$ represents the cofactor of the distortion component in Equation 28 or Equation 29, and the condition that this shall be zero is equivalent to Equation 20. However, if desired the positive feedback can be removed, that is, $Z_a$ made zero, and then from Equation 13 the distortion can still be made zero provided that $$r_a + Z_A = 0 \quad (31)$$

and oscillations will be avoided when the graph of $$\mu_a' \mu_b Z_A Z_b + (r_a + Z_A)(Z_B + r_b + Z_b) \quad (32)$$

does not pass through or encircle the origin. The condition 31 requires that one of the impedances $r_a$ or $Z_A$ shall be negative. Since $r_a$ is the plate impedance of a vacuum tube it can, if desired, be made negative by employing a screen grid tube with low enough plate potential to locate the operating point on that portion of the plate-potential plate-current characteristic where the slope is negative because of secondary electrons leaving the plate and going to the screen. An alternate way of satisfying 31 would be to employ a circuit element as a part of $Z_A$ which would produce a negative resistance. For example, an auxiliary vacuum tube might be employed either to give the negative resistance directly as described just above, or else to give the negative resistance by the use of local feedback in a tube which does not depend upon secondary emission.

Moreover, both the simple negative impedance and the specific positive feedback may be employed in combination. For one example, in the illustration of Fig. 2 and Equation 13, $Z_c$ may be made different from zero and $Z_A$ negative at the same time. The distortion then vanishes when the coefficient of $D'$ in Equation 13 is zero. As another example, in the multiple feedback circuit of Fig. 7, the specific positive feedback $\alpha_1$ may be replaced by a negative impedance in the manner just described in connection with Fig. 2 and Equation 31 while $\alpha_2$ retains its form as shown in detail in Fig. 2 and described in connection with Equations 12 to 21.

What is claimed is:

1. In a wave translating system having cascaded amplifying stages, means for producing negative feedback around a group of said stages including the last, with the normal value of the feedback ratio for said negative feedback substantially greater than unity, and means for producing positive feedback around certain of the stages exclusive of said last stage but including certain of the other stages of said group, with the vector feedback ratio for said positive feedback approximating unity sufficiently to substantially reduce distortion of translated waves.

2. A wave amplifying system having means producing positive feedback around a portion of said system, with the feedback ratio for said positive feedback approximately unity in the transmission band, and means for producing negative feedback around another portion of said system including at least a part of said first portion and including also an amplifying portion of said system following said first portion, with the feedback ratio for said second feedback at least several times unity in the transmission band and with the time of feedback of a given point of a wave to be translated substantially the same for said positive feedback as for said negative feedback.

3. A multistage amplifier for amplifying waves of a band of frequencies, comprising means for producing positive feedback in the transmission band around certain of the stages excluding the last with the vector feedback ratio for said positive feedback unity and means for producing over-all negative feedback with the feedback ratio of greater order of magnitude than unity in the transmission band and with the feedback loop propagation time at a given frequency at least substantially as small for the negative feedback as for the positive feedback.

4. An amplifier comprising two cascaded amplifying portions, the second of said portions including a device originating distortion, an incoming circuit for supplying to the input of the amplifier waves of a wide frequency range to be amplified without distortion, an outgoing circuit for receiving from the amplified undistorted waves, and means for reducing the distortion originated in said device, said distortion reducing means comprising means for producing positive feedback of said waves around the first of said two cascaded portions, with the vector feedback ratio for said positive feedback approximately unity over said frequency range, and means for producing negative feedback of said waves around a portion of said amplifier including at least a part of the first of said two cascaded portions and including also said device, with the normal absolute value of the feedback ratio for said negative feedback having a greater order of magnitude than unity and with the resultant of said positively and negatively fed-back waves at a point in the amplifier common to said portions always of the sign of the negatively fed-back wave and at all times of magnitude sufficient to reduce distortion of the amplified waves below the distortion without feedback.

5. A wave amplifying device having means producing positive feedback around a portion of said device, with the feedback ratio for said positive feedback substantially unity for a frequency at which distortion is undesirable, and means for producing feedback around another portion of said device including at least a part of said first portion and including also an amplifying portion of said device succeeding said first portion, with the normal value of the vector sum of the two feedback ratios greater in absolute value than zero at said frequency and such that a graph of the real part plotted against the imaginary part for all real values of frequency neither encircles nor touches the point 1, 0.

6. In a wave translating system having cascaded amplifying stages, means for producing positive feedback around certain of said stages excluding the last stage, with the vector feedback ratio for said positive feedback approximately unity in the frequency band where distortion is undesirable, and means for producing negative feedback around certain of the stages including said last stage and including also certain of said stages around which said positive feedback is produced, with the feedback ratio for said negative feedback of such value as to prevent the free response of the system from increasing with time and render the normal value of the vector sum of the two feedback ratios greater in absolute magnitude than zero in said frequency band and such that a graph of the real part plotted against the imaginary part for all real values of frequency neither encircles nor passes through the point 1, 0.

7. An amplifier comprising two cascaded portions, the first of said portions being subdivided into a plurality of sub-portions in cascade, a circuit for supplying waves to be amplified to the input of said amplifier, means for producing positive feedback individually around each of said sub-portions with the vector feedback ratio for each of said positive feedbacks substantially unity, and means for normally producing negative feedback of said waves around a portion of said amplifier including at least a part of the first sub-portion of said two cascaded portions and including also the second cascaded portion.

8. A wave amplifying system comprising two cascaded portions, the first of said portions being subdivided into a plurality of sub-portions in cascade, means for producing positive feedback individually around each of said sub-portions with the complex feedback ratio for each of said positive feedbacks approximately unity in the transmission band, and means for producing negative feedback of waves around a portion of said system including at least a part of the first of said sub-portions and including also the second cascaded portion, with the absolute magnitude of the complex feedback ratio for said negative feedback of greater order than unity.

9. A wave amplifying system comprising two cascaded portions, the first of said portions being subdivided into a plurality of sub-portions in cascade, means for producing positive feedback individually around each of said sub-portions with the complex feedback ratio for one of said feedbacks substantially unity at one prescribed frequency at which distortion is to be reduced and the complex feedback ratio for the other of said feedbacks substantially unity at a substantially different prescribed frequency at which distortion is to be reduced, and means for producing negative feedback of waves around a portion of said system including at least a part of the first of said sub-portions and including also the second cascaded portion, with the absolute magnitude of the complex feedback ratio for said negative feedback at least several times unity.

10. The method of operating a wave translating system including in tandem connection an impedance network followed by a wave amplifying device which comprises transmitting signal waves to be translated through said network, amplifying the transmitted waves in said device, normally producing substantial alteration of the amplified signal waves by substantial normal feedback of signal waves in the system, and at the same time feeding back to said network distortion components originated in said amplifying device, modifying said feed back distortion components by transmitting them through said network, and applying said modified distortion components to the input of said amplifying device in phase differing from their original phase by 180 degrees minus the phase shift through the amplifying device and with amplitude equal to the original amplitude of the distortion waves divided by the modulus of the amplification factor of said amplifying device.

11. A wave translating system comprising in tandem connection an impedance network and a wave amplifying device fed by said impedance network, said device producing distortion, means for producing over-all negative feedback around said amplifying device and said network with the normal value of the modulus of the complex feedback ratio substantially different from unity in the transmission band, and means in said network responsive to distortion waves fed back to said network for producing distortion waves at the input of said amplifying device having their phase depart from the original phase of the distortion waves by 180 degrees minus the phase shift through the amplifying device and their amplitude equal to the original amplitude of the distortion waves divided by the modulus of the amplification factor of said amplifying device.

12. A wave translating network comprised of impedance elements including distortion producing elements, a wave transmitting path and a wave amplifying device connected in tandem included in said network, said wave transmitting path including an impedance mesh incorporating a negative impedance device, a feedback path included in said network connected around said amplifying device and a portion of said wave transmitting path including said impedance, the impedances of said impedance elements having values such that in the solution of the first order network equations the coefficients of the distortion components of the output current vanish while the coefficient of the desired output current remains different from zero and the complete solution contains no terms increasing indefinitely with time.

13. A wave translating system comprising an amplifying portion working into an impedance equal and opposite in sign to its own impedance, followed in cascade by a further amplifying portion, with means producing over-all negative feedback around both portions.

FREDERICK B. LLEWELLYN.